(12) United States Patent
Jafari et al.

(10) Patent No.: US 11,560,827 B2
(45) Date of Patent: Jan. 24, 2023

(54) ROTARY VALVE ASSEMBLY FOR COOLANT CONTROL VALVE AND COOLANT CONTROL VALVE WITH ROTARY VALVE ASSEMBLY

(71) Applicant: Schaeffler Technologies AG & Co. KG, Herzogenaurach (DE)

(72) Inventors: Ali Jafari, Troy, MI (US); Michael Murray, Commerce Township, MI (US)

(73) Assignee: Schaeffler Technologies AG & Co. KG, Herzongenaurach (DE)

( * ) Notice: Subject to any disclaimer, the term of this patent is extended or adjusted under 35 U.S.C. 154(b) by 13 days.

(21) Appl. No.: 16/991,343

(22) Filed: Aug. 12, 2020

(65) Prior Publication Data
US 2021/0047959 A1 Feb. 18, 2021

Related U.S. Application Data

(60) Provisional application No. 62/886,988, filed on Aug. 15, 2019.

(51) Int. Cl.
*F16K 5/06* (2006.01)
*F01P 7/14* (2006.01)
*F16K 5/12* (2006.01)
*F16K 31/53* (2006.01)
*F01P 7/16* (2006.01)
(Continued)

(52) U.S. Cl.
CPC .................. *F01P 7/14* (2013.01); *F01P 7/16* (2013.01); *F16K 5/0605* (2013.01); *F16K 5/0647* (2013.01); *F16K 5/12* (2013.01); *F16K 11/087* (2013.01); *F16K 11/12* (2013.01); *F16K 31/535* (2013.01); *F01P 2007/146* (2013.01); *Y10T 137/86533* (2015.04);
(Continued)

(58) Field of Classification Search
CPC .......... F01P 7/14; F01P 2007/146; F01P 7/16; F16K 5/0605; F16K 5/0647; F16K 5/12; F16K 31/535; F16K 11/087; F16K 11/12; Y10T 137/86533; Y10T 137/86541; Y10T 137/87032; Y10T 137/87145
USPC .............. 137/625.15, 625.16, 630.21, 637.5, 137/613–614.21; 251/208–209
See application file for complete search history.

(56) References Cited

U.S. PATENT DOCUMENTS

| 466,433 | A | * | 1/1892 | Shortt | B60T 15/043 137/630.21 |
| 661,175 | A | * | 11/1900 | Haigh | F16K 5/0207 137/637.5 |

(Continued)

*Primary Examiner* — John Bastianelli
(74) *Attorney, Agent, or Firm* — Volpe Koenig

(57) ABSTRACT

A coolant control valve, including: a housing with a first port and a second port; a primary rotary valve disposed within the housing and including a primary body; and a secondary rotary valve disposed within the housing and including a secondary body. The primary rotary valve and the secondary rotary valve are rotatable around the axis of rotation by at least one actuator to a first configuration. In a first configuration of the primary rotary valve and the secondary rotary valve around the axis of rotation: a first straight line, orthogonal to the axis of rotation, passes through the primary body and the first port; and a second straight line, orthogonal to the axis of rotation and co-planar with the first straight line, passes through the secondary body and the second port.

16 Claims, 19 Drawing Sheets

(51) Int. Cl.
*F16K 11/087* (2006.01)
*F16K 11/12* (2006.01)

(52) U.S. Cl.
CPC .............. *Y10T 137/86541* (2015.04); *Y10T 137/87032* (2015.04); *Y10T 137/87145* (2015.04)

(56) References Cited

U.S. PATENT DOCUMENTS

| | | | | |
|---|---|---|---|---|
| 1,620,464 | A | * | 3/1927 | Huff ............... F22B 37/545 137/246.22 |
| 1,803,773 | A | * | 5/1931 | Schmidt ............ F16K 5/204 251/249.5 |
| 2,769,456 | A | * | 11/1956 | Atkinson ............. F16K 5/00 137/637.5 |
| 2,997,057 | A | * | 8/1961 | Toth ............... F16K 5/0471 137/454.2 |
| 3,069,025 | A | | 12/1962 | Winkler et al. |
| 3,127,909 | A | * | 4/1964 | Alamprese ........ F16K 5/0421 251/185 |
| 5,285,536 | A | | 2/1994 | Long |
| 7,497,431 | B2 | | 3/2009 | Takai et al. |
| 8,220,488 | B2 | * | 7/2012 | McCully ............ F16K 11/085 137/614.16 |
| 8,950,430 | B2 | * | 2/2015 | Kukielka ........... F16K 11/087 137/614.16 |
| 2016/0084145 | A1 | | 3/2016 | Fulton |
| 2019/0024815 | A1 | * | 1/2019 | Lou ................. F16K 27/065 |

* cited by examiner

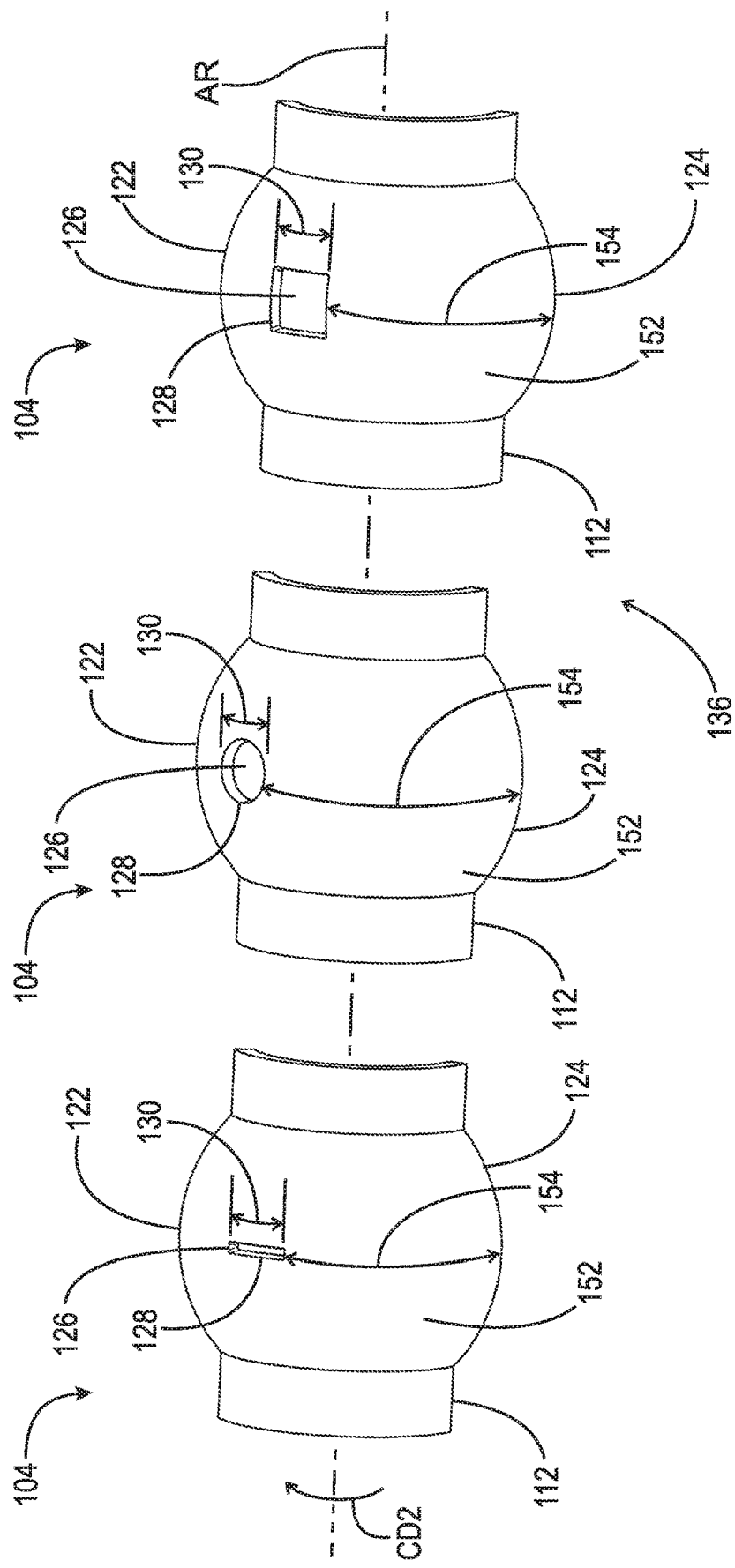

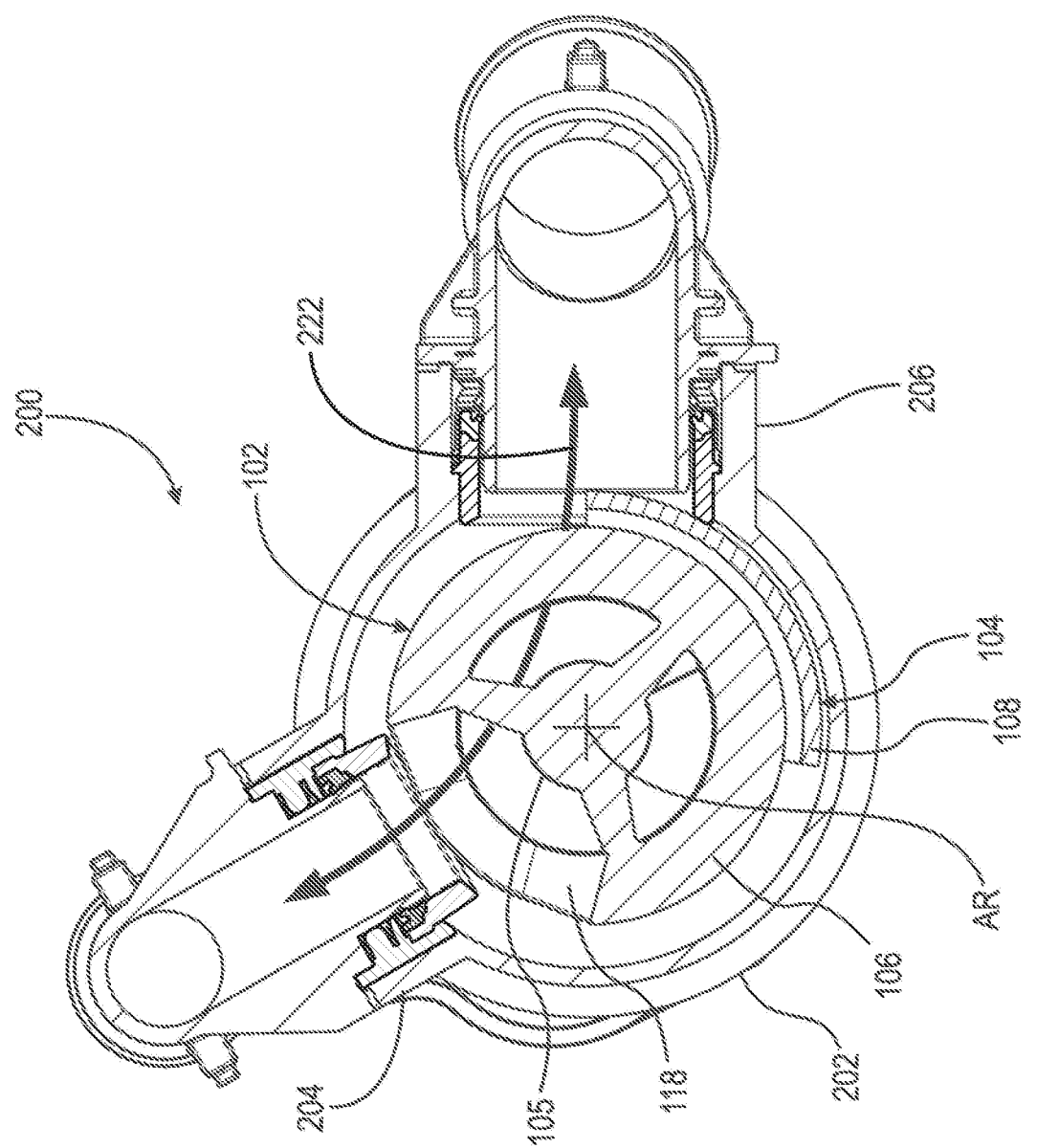

ROTARY VALVE ASSEMBLY FOR COOLANT CONTROL VALVE AND COOLANT CONTROL VALVE WITH ROTARY VALVE ASSEMBLY

CROSS-REFERENCE TO RELATED APPLICATIONS

This application claims the benefit under 35 U.S.C. § 119(e) of U.S. Provisional Application No. 62/886,988 filed on Aug. 15, 2019, which application is incorporated herein by reference.

TECHNICAL FIELD

The present disclosure relates to an axially compact rotary valve assembly for a coolant control valve and a coolant control valve with an axially compact rotary valve assembly.

BACKGROUND

Coolant control valves are used for temperature and flow rate management of a variety of components and systems.

SUMMARY

According to aspects illustrated herein, there is provided a rotor control assembly for a coolant control valve, the rotor control assembly including: a primary rotary valve arranged to be rotated around an axis of rotation by at least one actuator, and including a primary body; and a secondary rotary valve arranged to be rotated around the axis of rotation and with respect to the primary rotary valve by the at least one actuator, and including a secondary body. At least a portion of the primary rotary valve is nested within the secondary rotary valve. In a first configuration of the primary rotary valve and the secondary rotary valve around the axis of rotation: at least a portion of the secondary body overlaps the primary body; and a first straight line, orthogonal to the axis of rotation, passes through the primary body and the secondary body.

According to aspects illustrated herein, there is provided a coolant control valve, including: a housing with a first port and a second port; a primary rotary valve disposed within the housing and including a primary body; and a secondary rotary valve disposed within the housing and including a secondary body. The primary rotary valve and the secondary rotary valve are rotatable around the axis of rotation by at least one actuator to a first configuration. In a first configuration of the primary rotary valve and the secondary rotary valve around the axis of rotation: a first straight line, orthogonal to the axis of rotation, passes through the primary body and the first port; and a second straight line, orthogonal to the axis of rotation and co-planar with the first straight line, passes through the secondary body and the second port.

According to aspects illustrated herein, there is provided a coolant control valve, including: a housing with a first port and an second port; a secondary rotary valve disposed within the housing and including a secondary body; and a primary rotary valve including at least a portion nested within the secondary rotary valve, including a primary body, and defining a primary opening. The primary rotary valve and the secondary body define a secondary opening. The primary rotary valve and the secondary rotary valve are rotatable by at least one actuator and around an axis of rotation of the primary rotary valve and the secondary rotary valve to: a zero flow configuration in which the primary body blocks the first port and the secondary body blocks the second port; or a first flow configuration in which the primary opening overlaps at least a portion of the first port and none of the second body overlaps the second port; or a second flow configuration in which the primary opening overlaps an entirety of the first port and the secondary body blocks a only portion of the second port; or a third flow configuration in which the primary body blocks the first port and the secondary body blocks only a portion of the second port.

BRIEF DESCRIPTION OF THE DRAWINGS

Various embodiments are disclosed, by way of example only, with reference to the accompanying schematic drawings in which corresponding reference symbols indicate corresponding parts, in which:

FIGS. 6A through 6F shown embodiments of a secondary rotary valve for the valve assembly shown in FIG. 1;

FIG. 17 is a cross-sectional view generally along line 9,12-17/9,12-17 in FIG. 7.

DETAILED DESCRIPTION

At the outset, it should be appreciated that like drawing numbers on different drawing views identify identical, or functionally similar, structural elements of the disclosure. It is to be understood that the disclosure as claimed is not limited to the disclosed aspects.

Furthermore, it is understood that this disclosure is not limited to the particular methodology, materials and modifications described and as such may, of course, vary. It is also understood that the terminology used herein is for the purpose of describing particular aspects only, and is not intended to limit the scope of the present disclosure.

Unless defined otherwise, all technical and scientific terms used herein have the same meaning as commonly understood to one of ordinary skill in the art to which this disclosure belongs. It should be understood that any methods, devices or materials similar or equivalent to those described herein can be used in the practice or testing of the disclosure.

Figure 1:
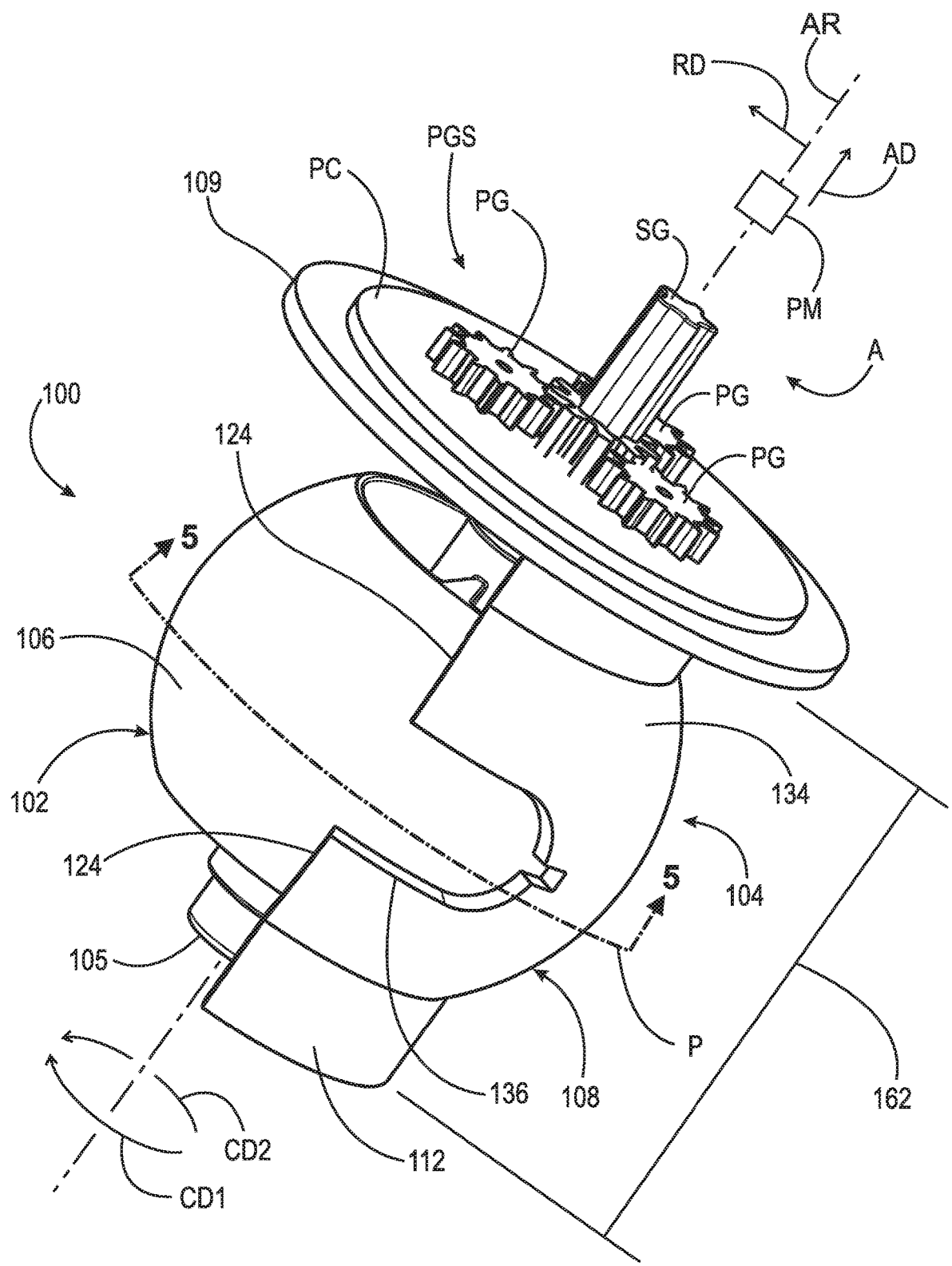
FIG. 1 is an isometric view of a valve assembly for a coolant control valve.

FIG. 1 is an isometric view of valve assembly 100 for a coolant control valve.

Figure 2:
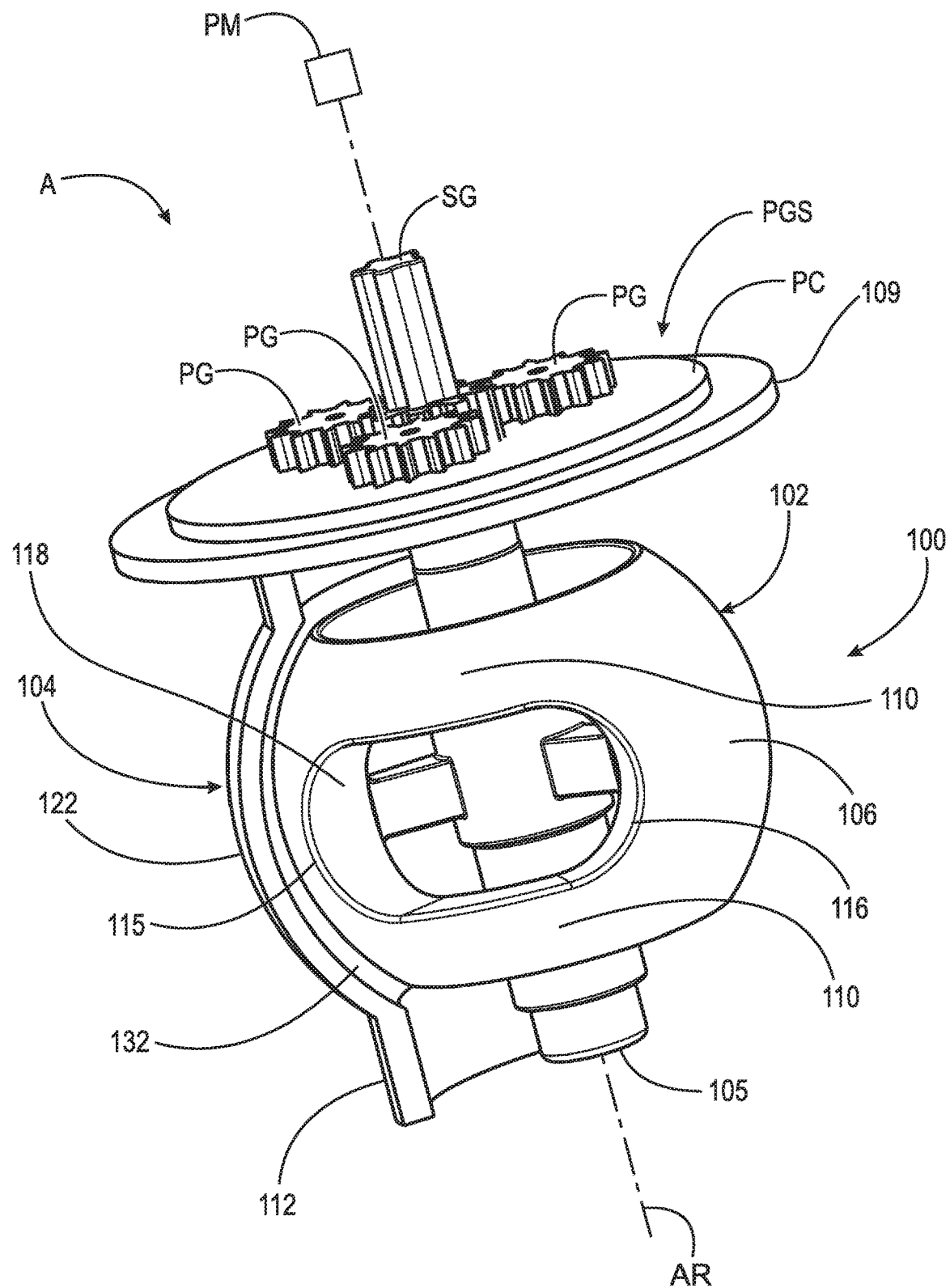
FIG. 2 is an isometric view of the valve assembly shown in FIG. 1.

FIG. 2 is an isometric view of valve assembly 100 shown in FIG. 1.

Figure 3:
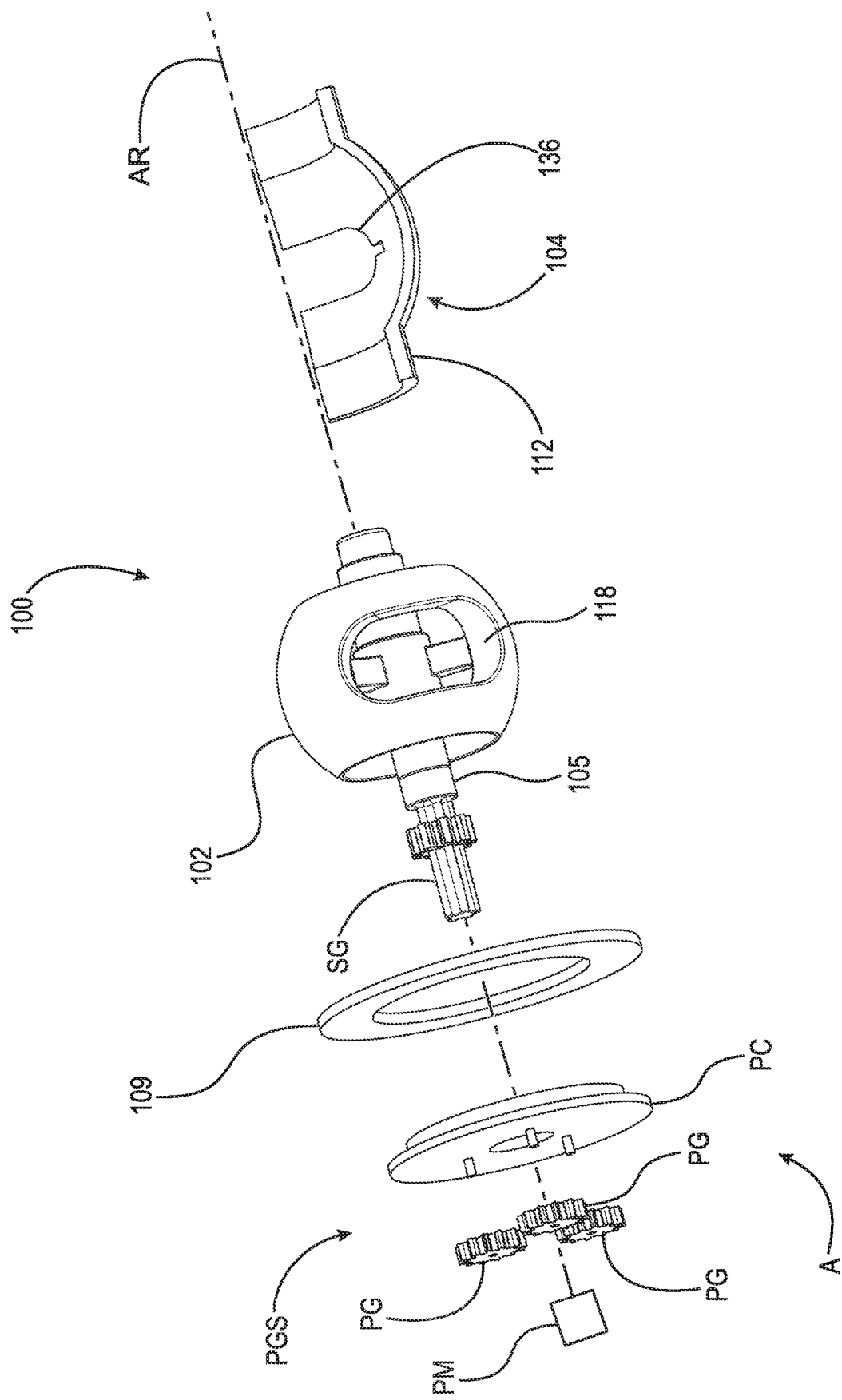
FIG. 3 is an exploded view of the valve assembly shown in FIG. 1.

FIG. 3 is an exploded view of valve assembly 100 shown in FIG. 1.

Figure 4:
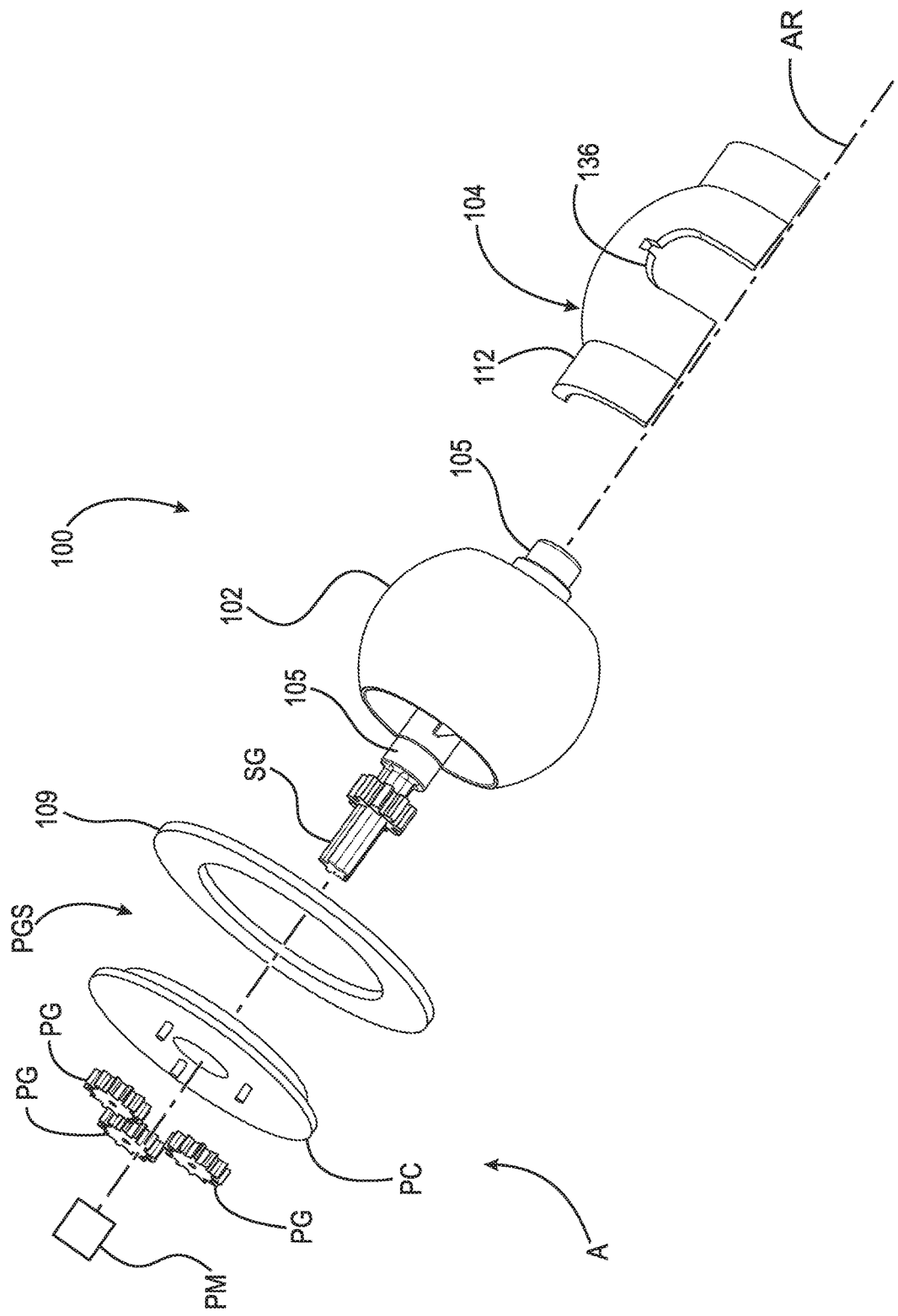
FIG. 4 is an exploded view of the valve assembly shown in FIG. 1.

FIG. 4 is an exploded view of valve assembly 100 shown in FIG. 1. The following should be viewed in light of FIGS. 1 through 4. Valve assembly 100 for a coolant control valve includes primary rotary valve 102 and secondary rotary valve 104. Primary rotary valve 102 includes center shaft 105 and primary body 106. Secondary rotary valve 104 includes secondary body 108 and retention plate 109. Primary rotary valve 102 and secondary rotary valve 104 are rotatable, by at least one actuator A, around axis of rotation AR and with respect to each other. Actuator A can be any actuator known in the art.

In the example of FIG. 1, actuator A includes prime mover PM (shown schematically) and planetary gear set PGS. Planetary gear set PGS includes: sun gear SG non-rotatably connected to center shaft 105; planet gears PG; and planet carrier PC non-rotatably connected secondary valve 104. Any prime mover and intermediary gearing known in the art can be used for actuator A.

By "non-rotatably connected" components, we mean that components are connected so that whenever one of the components rotates, all the components rotate; and relative rotation between the components is precluded. Radial and/or axial movement of non-rotatably connected components with respect to each other is possible. Components connected by tabs, gears, teeth, or splines are considered as non-rotatably connected despite possible lash inherent in the connection. The input and output elements of a closed clutch are considered non-rotatably connected despite possible slip in the clutch. The input and output parts of a vibration damper, engaged with springs for the vibration damper, are not considered non-rotatably connected due to the compression and unwinding of the springs. Without a further modifier, the non-rotatable connection between or among components is assumed for rotation in any direction. However, the non-rotatable connection can be limited by use of a modifier. For example, "non-rotatably connected for rotation in circumferential direction X," defines the connection for rotation only in circumferential direction X.

Figure 5:
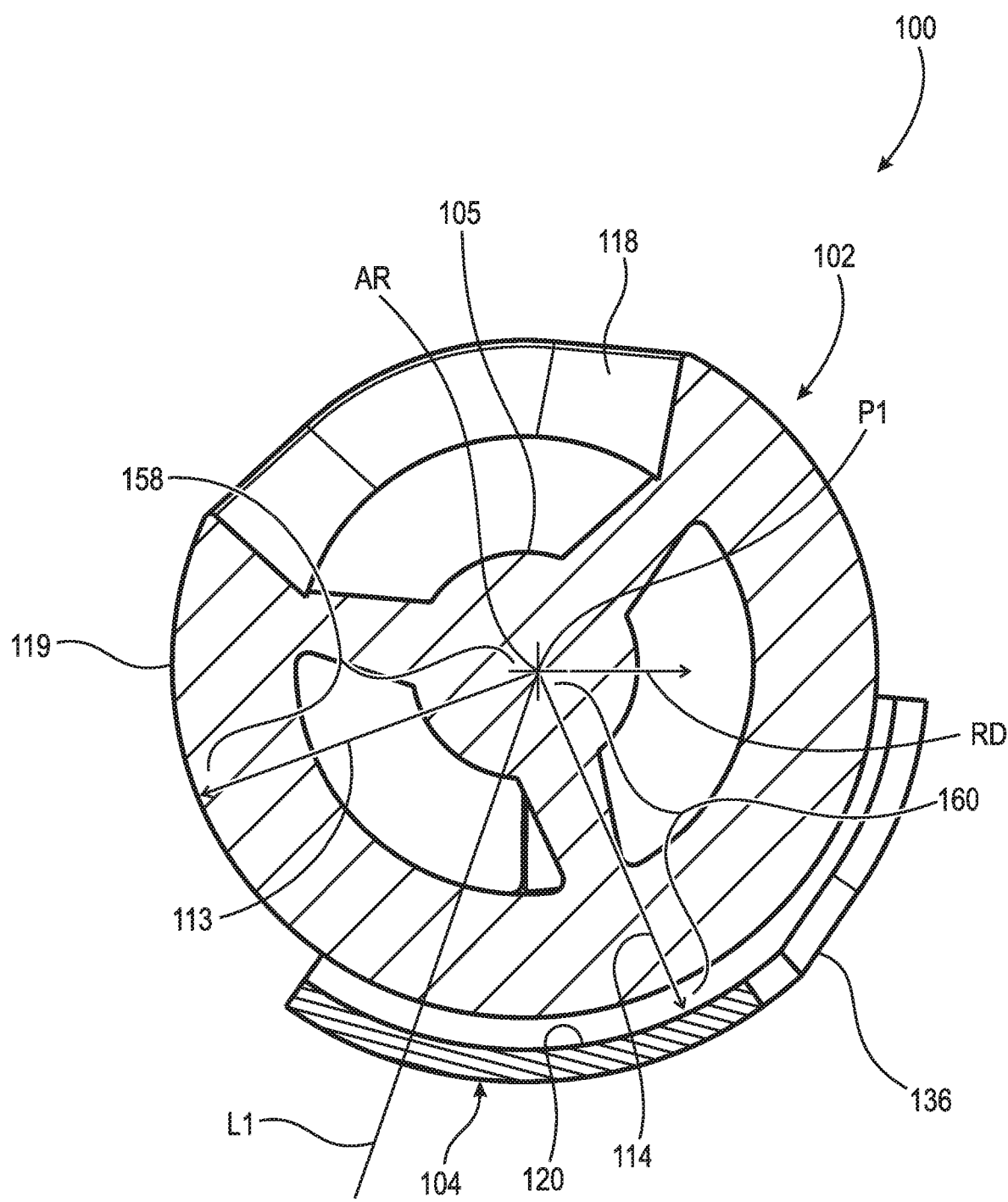
FIG. 5 is a cross-sectional view generally along line 5/5 in FIG. 1.

FIG. 5 is a cross-sectional view generally along line 5/5 in FIG. 1. The following should be viewed in light of FIGS. 1 through 5. At least a portion of secondary rotary valve 104 radially overlaps at least a portion of primary rotary valve 102 in radial direction RD, orthogonal to axis of rotation AR. For example, in FIG. 5, straight line L1, orthogonal to axis of rotation AR and in radial direction RD, passes through primary body 106 and secondary body 108. In the example of FIG. 5, an entirety of secondary body 108 overlaps primary body 106.

For the discussion that follows and unless noted otherwise: "radial overlap" of components means a straight line, orthogonal to axis of rotation AR and in radial direction RD, passes through the components; and for components to "overlap, in a radial direction RD" a straight line, orthogonal to axis of rotation AR and in radial direction RD, passes through the components.

At least a portion of primary rotary valve 102 is nested within secondary rotary valve 104, for example, at least a portion of primary body 106 is nested with secondary body 108.

At least a portion of secondary body 108 is located radially outward primary rotary valve 102, for example, at least a portion of secondary body 108 is radially outward of primary body 106. In the example of FIG. 1, an entirety of secondary body 108 is radially outward of primary body 106. In the example of FIG. 1: plane P, co-linear with section line 5/5, axially bisects primary body 106 and secondary body 108. That is, plane P divides body 106 and body 108 in axial direction AD, parallel to axis of rotation AR.

In an example embodiment: regardless of the relative rotation between valve 102 and valve 104, actuator A is configured such that an entirety of secondary body 108 always overlaps primary body 106; and an entirety of secondary body 108 is radially outward of primary body 106. In an example embodiment (not shown), actuator A is configured such that relative rotation between primary rotary valve 102 and secondary rotary valve 104 results in only a portion of secondary body 108 radially overlaps primary body 106.

In an example embodiment: primary rotary valve 102 is a ball valve; primary body 106 forms a portion of a first sphere centered on point P1 on axis of rotation AR; and secondary body 108 forms a portion of a second sphere, concentric with the first sphere, and centered on point P1. For example: radius 113 centered on point P1, centered on point P1, defines outer surface 119 of body 106, which is an outer surface of the first sphere; and radius 114, centered on point P1, defines inner surface 120 of body 108, which is an inner surface of the second sphere. Primary body 106 and secondary body 108 are not limited to respective spherical shapes. In the example of FIG. 1: primary body 106 includes annular portions 110 forming respective axial ends of primary rotary valve 102; and secondary rotary valve 104 includes flanges 112 forming respective axial ends of secondary rotary valve 104. In the example of FIG. 1, one flange 112 is non-rotatably connected to planet carrier PC.

In the example of FIG. 1, primary rotary valve 102 includes edge 115 and edge 116, each extending at least partly in axial direction AD. Annular portions 110 and edges 115 and 116 define primary opening 118. Edges 115 and 116 bound opening 118 in circumferential direction CD1 and annular portions 110 bound opening 118 in axial direction AD. In the example of FIG. 1, secondary rotary valve includes edge 122 and edge 124 extending at least partly in axial direction AD.

Figures 6A, 6B:
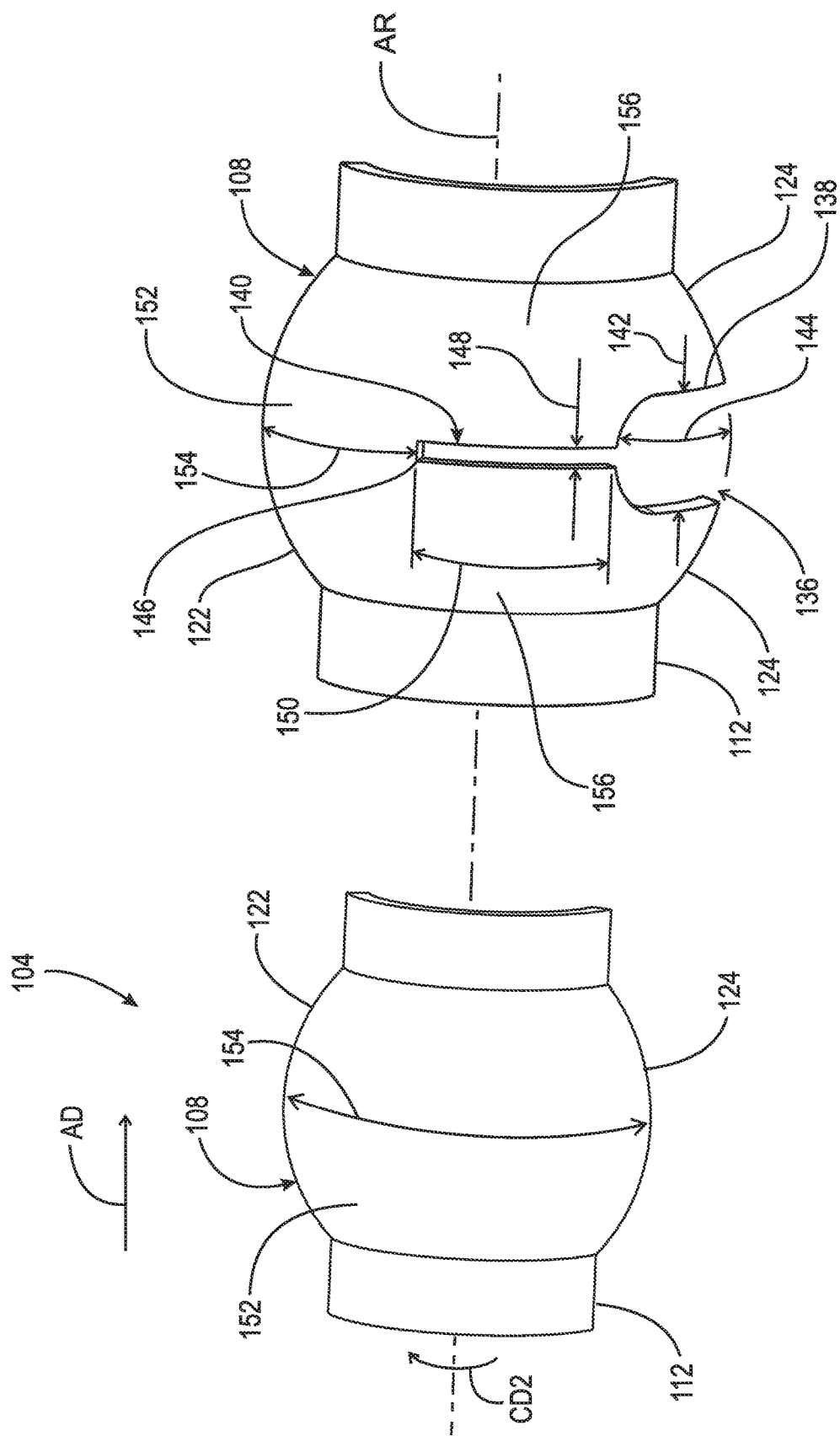

FIGS. 6A through 6F show example embodiments of secondary rotary valve 104 for valve assembly 100 shown in FIG. 1. The following should be viewed in light of FIGS. 1 through 6F. The embodiment of secondary rotary valve 104 of FIG. 6B is shown in FIGS. 1 through 5. However, it is understood that the embodiments of secondary rotary valve 104 shown in FIGS. 6A and 6C-6F can be used in valve assembly 100 in place of the embodiment of secondary rotary valve 104 shown in FIG. 6B.

In FIGS. 6A and 6D-6F, edges 122 and 124 form respective smooth continuous curves. For example, there are no indentations in edges 122 and 124. In FIGS. 6D-6F, secondary body 108 defines through-bore 126 bounded by continuous edge 128 of secondary body 108 and having circumferential extent 130 in direction CD1. Through-bore 126 connects oppositely facing sides 132 and 134 of secondary body 108. In FIG. 6A, secondary body 108 is free of a through-bore.

Figure 6C:
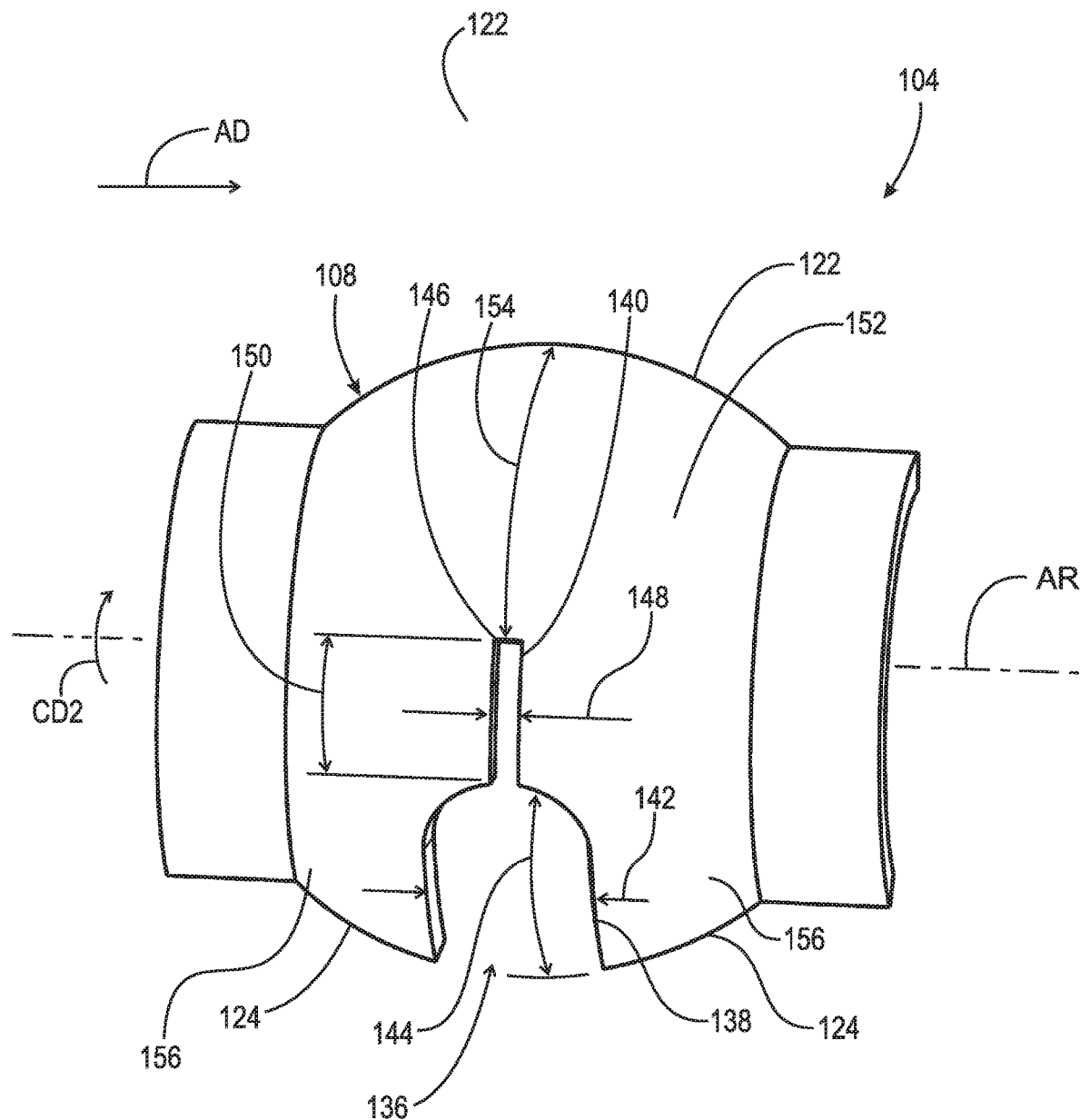

In FIGS. 6B and 6C, secondary body 108 defines slot 136 extending into secondary body 108, for example in circumferential direction CD2, from edge 124. Slot 136 includes portion 138 and portion 140. Portion 138: is directly connected to edge 124; has axial extent 142 in axial direction AD; and has circumferential extend 144 in direction CD2. Portion 140: extends from portion 138; includes closed end 146; has axial extent 148, in direction AD, less than axial extent 142; and has circumferential extent 150 in direction CD2. As further described below, through-bore 126 and slot 136 are used to throttle fluid flow in a coolant control valve including assembly 100. For each of the embodiments of FIGS. 6A through 6F, secondary body 108 includes solid portion 152 with circumferential extent 154 in direction CD2.

In the example of FIG. 1, secondary rotary valve 104 is discontinuous in circumferential direction CD1; and primary rotary valve 102, for example annular portions 110, is continuous in circumferential direction CD1.

Figure 7:
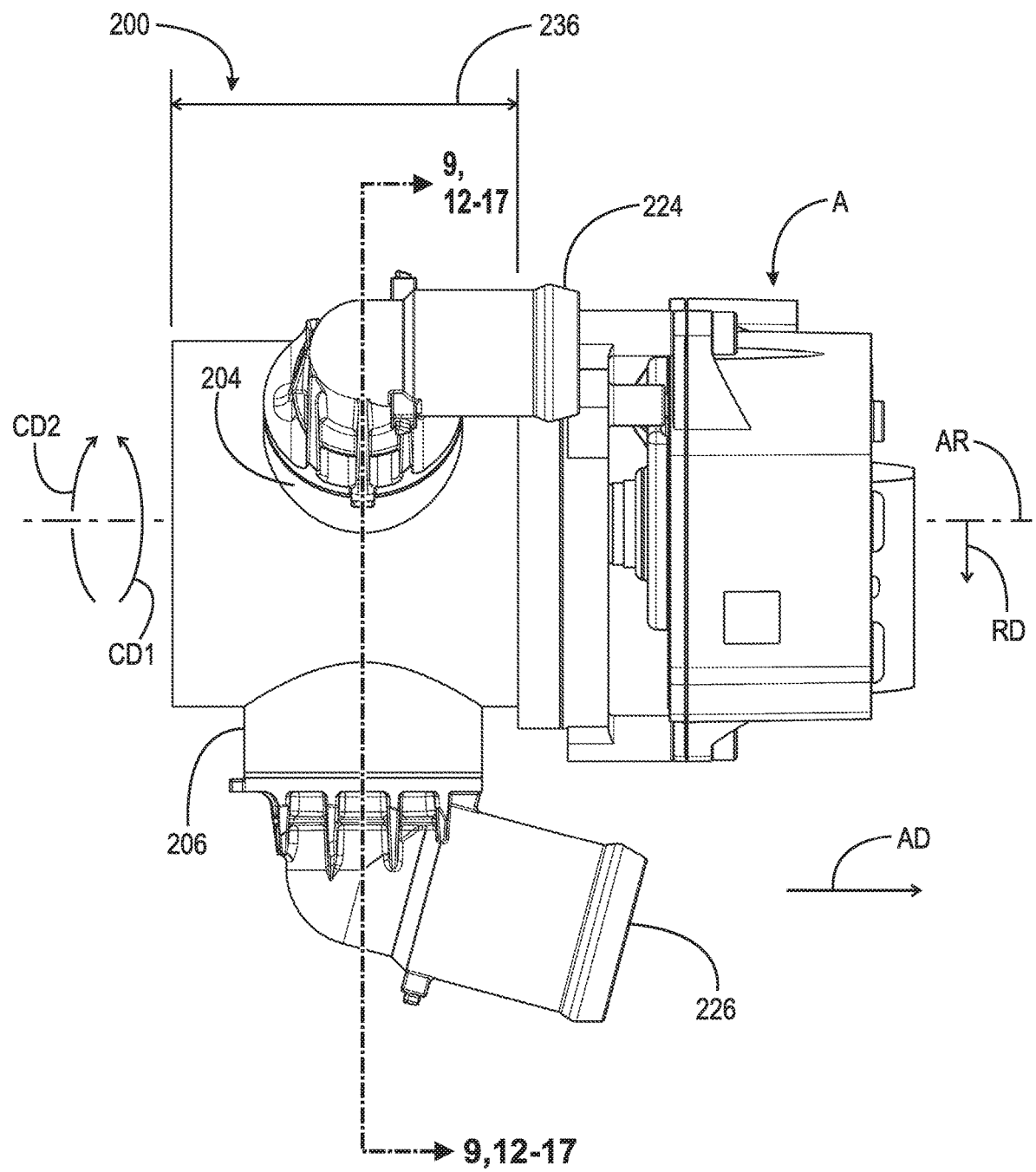
FIG. 7 is a top view of a coolant control valve including the valve assembly shown in FIG. 1.

FIG. 7 is a top view of coolant control valve 200 including valve assembly 100 shown in FIG. 1.

Figure 8:
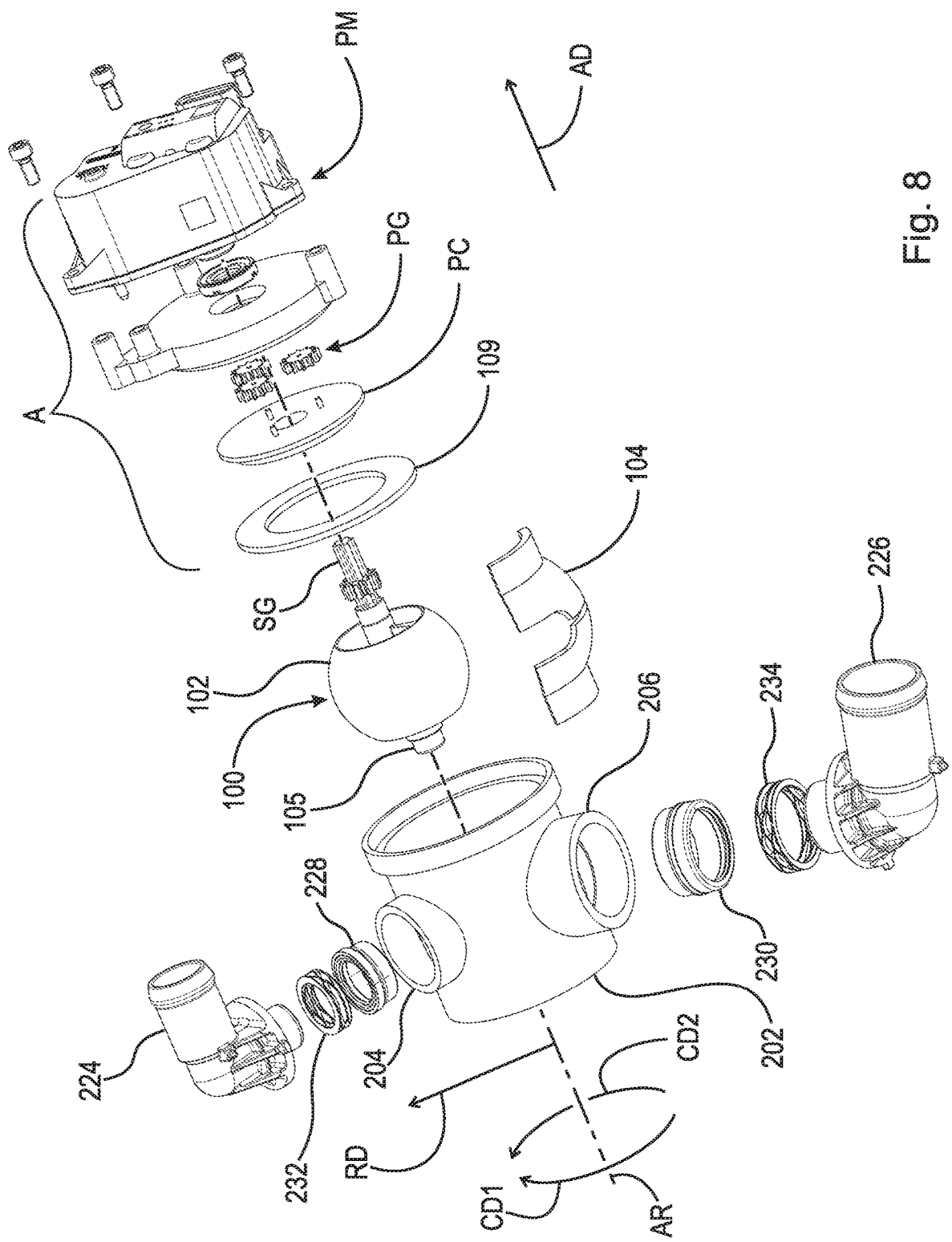
FIG. 8 is an exploded view of the coolant control valve shown in FIG. 7.

FIG. 8 is an exploded view of coolant control valve 200 shown in FIG. 7. In FIG. 8, valve assembly includes secondary rotary valve 104 shown in FIG. 6A. Coolant control valve 200 includes: housing 202 with port 204 and port 206; and valve assembly 100, with primary rotary valve 102 and secondary rotary valve 104, disposed in housing 202. In the example of FIG. 7, port 204 is an inlet port, and port 206 is an outlet port.

Figure 9:
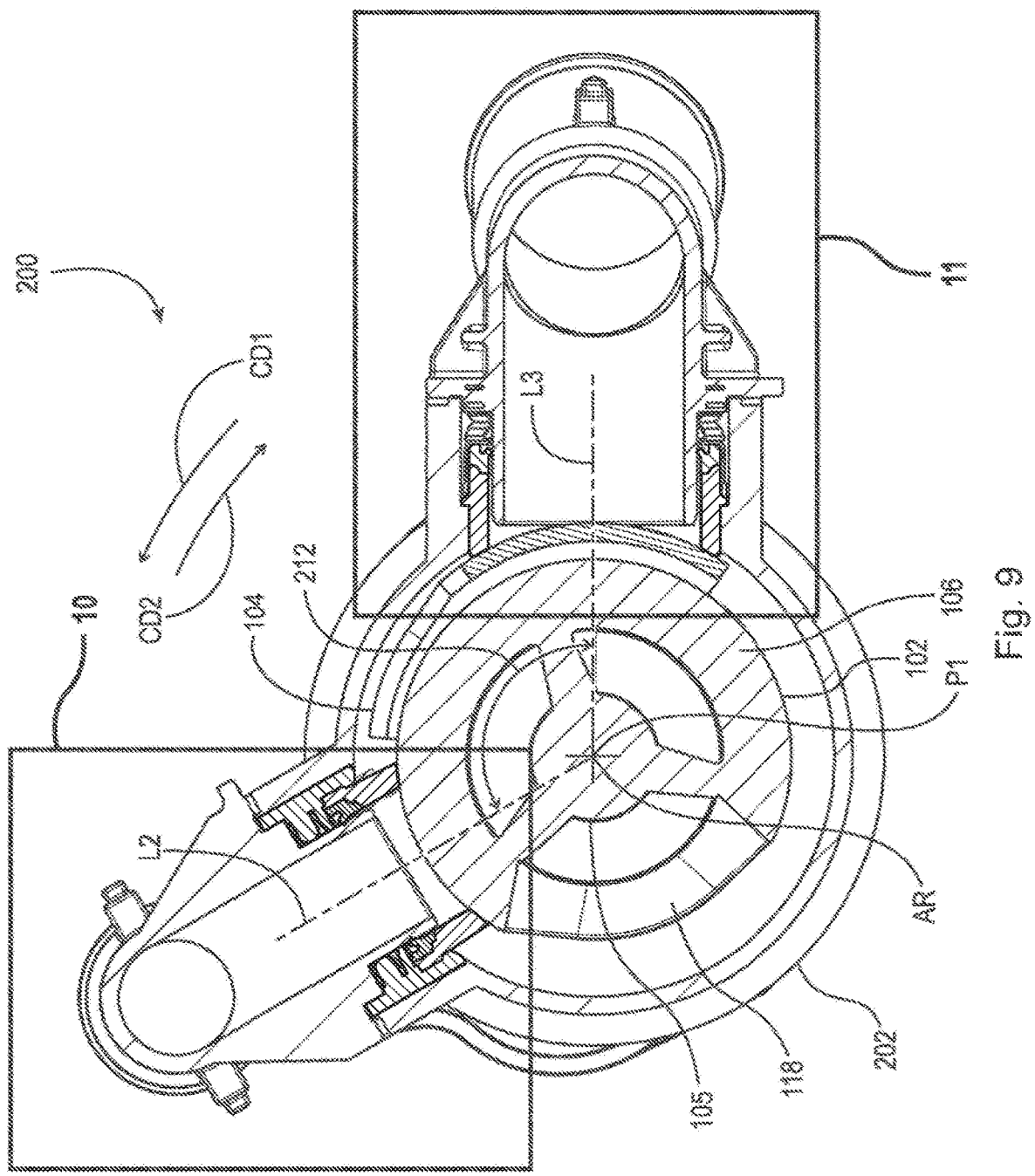
FIG. 9 is a cross-sectional view generally along line 9,12-17/9,12-17 in FIG. 7.

FIG. 9 is a cross-sectional view generally along line 9,12-17/9,12-17 in FIG. 7.

Figure 10:
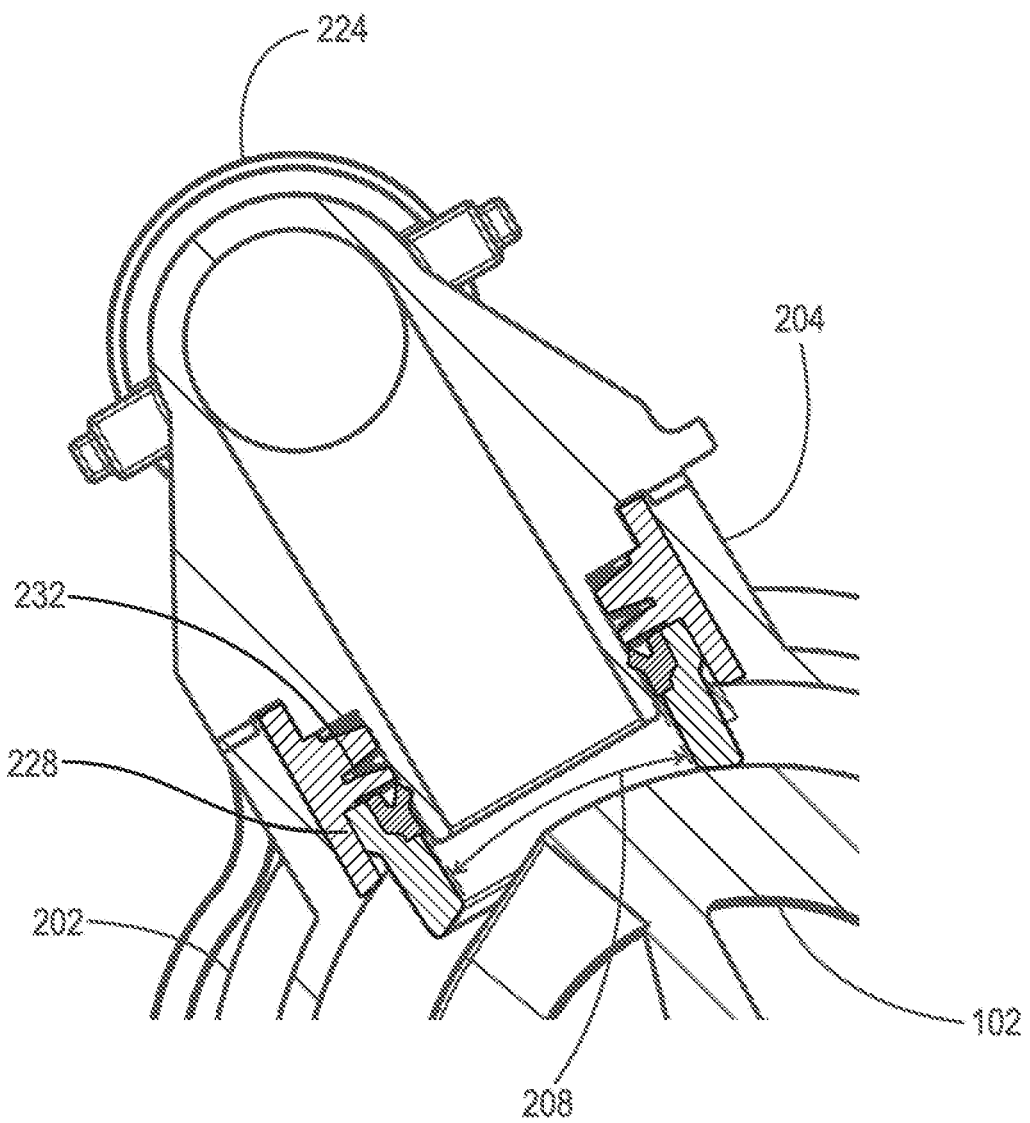
FIG. 10 is a detail of area 10 in FIG. 9.

FIG. 10 is a detail of area 10 in FIG. 9.

Figure 11:
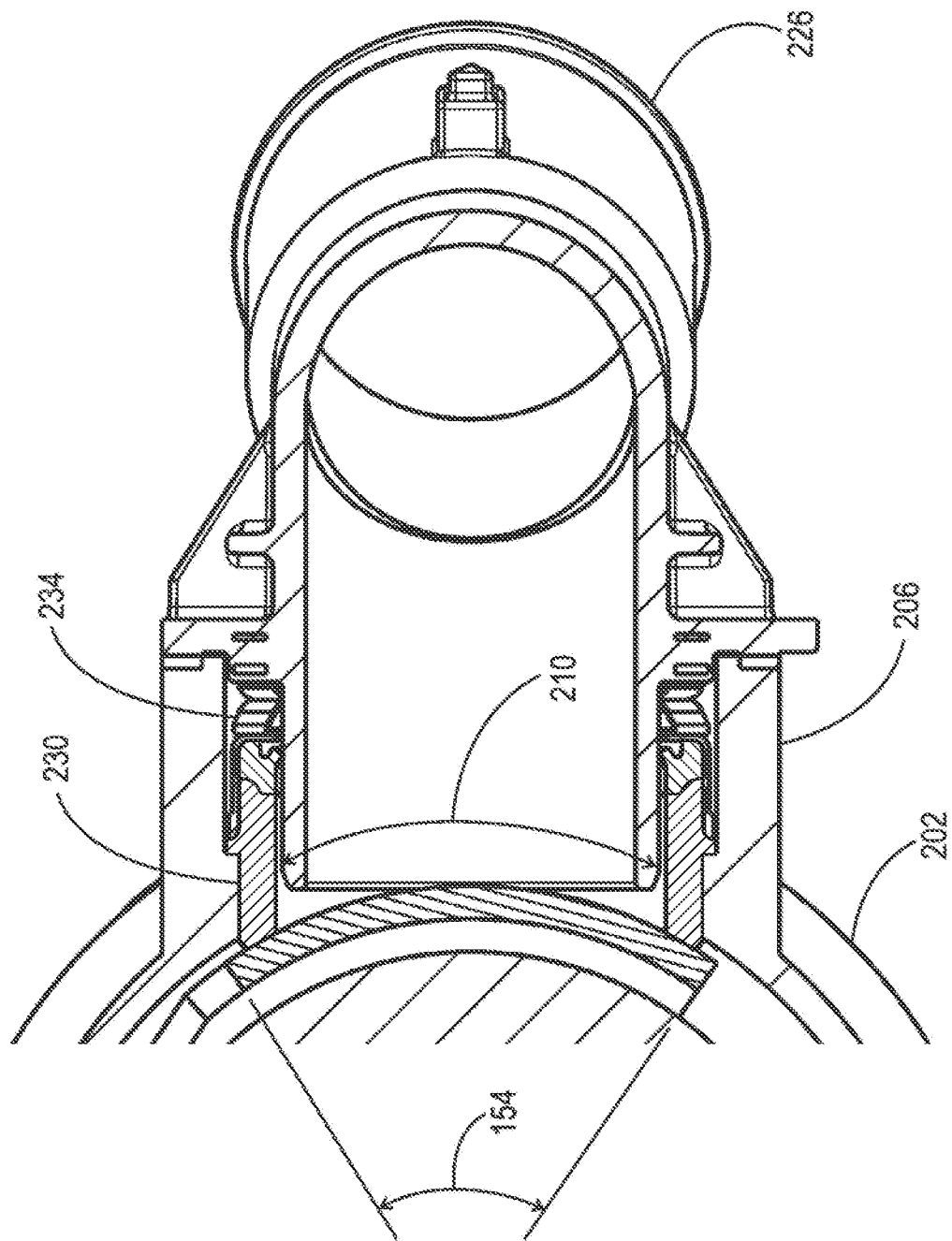
FIG. 11 is a detail of area 11 in FIG. 9.

FIG. 11 is a detail of area 11 in FIG. 9. Port 204 has circumferential extent 208 in direction CD1 and port 206 has circumferential extent 210 in direction CD1. In the example of FIG. 7, primary rotary valve 102 and secondary rotary valve 104 are simultaneously rotatable around axis of rotation AR by actuator A. For example, when one of primary rotary valve 102 or secondary rotary valve 104 is rotated by actuator A, the other of primary rotary valve 102 or secondary rotary valve 104 is rotated. Actuator A is arranged to simultaneously rotate primary rotary valve 102 and secondary rotary valve 104 around axis of rotation AR in one or both of circumferential directions CD1 and CD2. In an example embodiment not shown, primary rotary valve 102 and secondary rotary valve 104 are independently rotatable around axis of rotation AR.

FIG. 9 illustrates a zero flow configuration of coolant control valve 200. In the zero flow configuration of FIG. 9: circumferential extent 154 of secondary body 106 is equal to or greater than circumferential extent 210 of port 206; primary rotary valve 102 and secondary rotary valve 104 have been rotated around axis of rotation AR by actuator A such that primary body 106 blocks an entirety of port 204, and secondary body 108 blocks an entirety of port 206.

Thus, there is no flow of fluid through port 204 or port 206.

In FIG. 9, straight line L2, orthogonal to axis of rotation AR, passes through primary body 106 and port 204; and straight line L3, orthogonal to axis of rotation AR, passes through secondary body 108 and port 206. Line L2 and L3 each originate at point P1 on axis of rotation AR and are co-linear with plane P. In FIG. 9: line L2 is a center line for port 204; and line L3 is a center line for port 206. Coolant control valve 200 is not limited to a particular angle 212 between center lines for port 204 and port 206.

Figure 12:
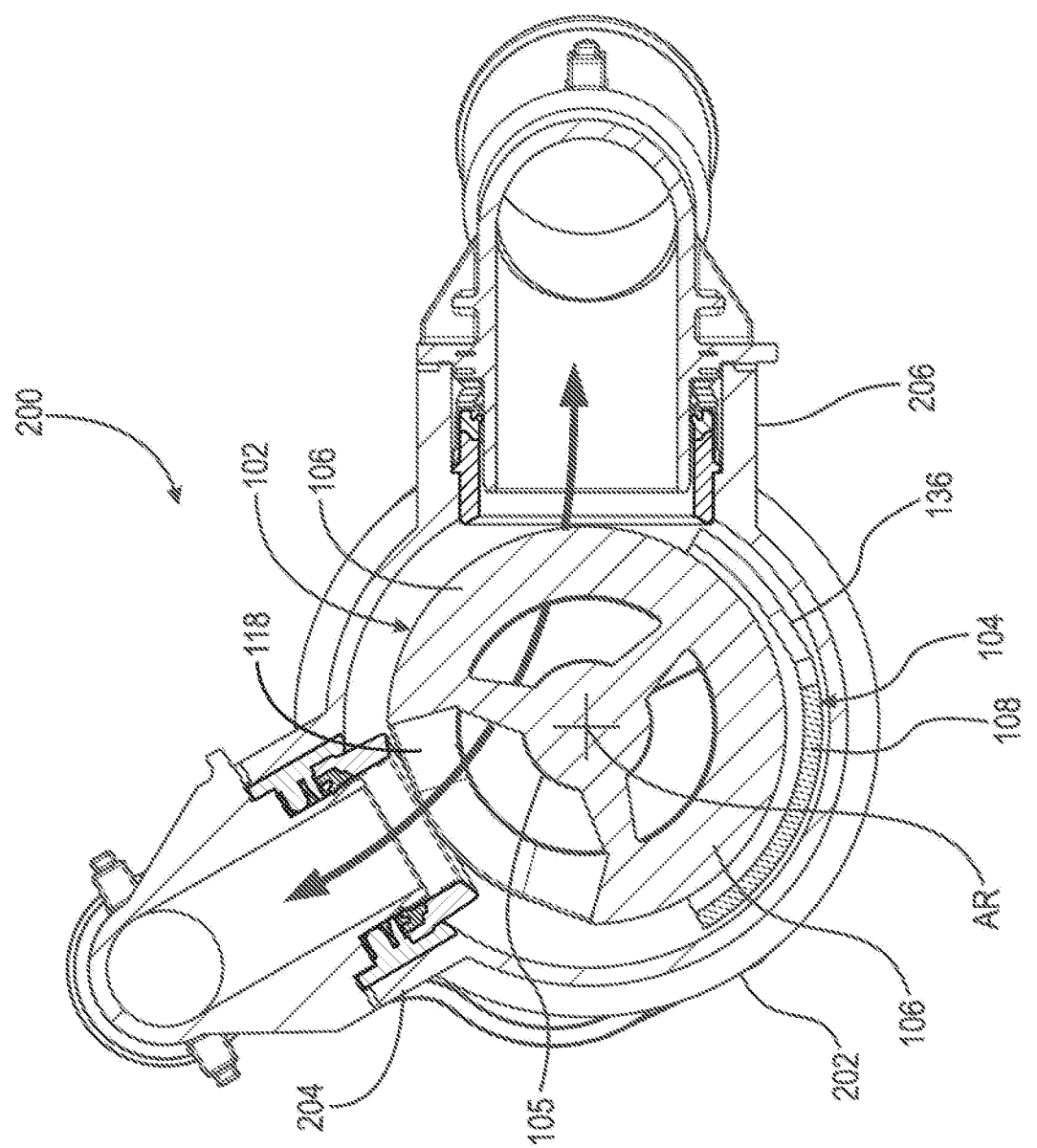
FIG. 12 is a cross-sectional view generally along line 9,12-17/9,12-17 in FIG. 7.

FIG. 12 is a cross-sectional view generally along line 9,12-17/9,12-17 in FIG. 7. FIG. 12 illustrates a first flow configuration of coolant control valve 200. In the first flow configuration of FIG. 12, primary rotary valve 102 and secondary rotary valve 104 have been rotated around axis of rotation AR by actuator A such that primary opening 118 overlaps at least a portion of port 204 and none of secondary body 108 overlaps port 206. Thus, coolant fluid flow path 214 is enabled through port 204, valve 200, and port 206. In the example of FIG. 12, opening 118 overlaps an entirety of port 204. In an example embodiment, the direction of flow is through port 204 into valve 200.

Figure 13:
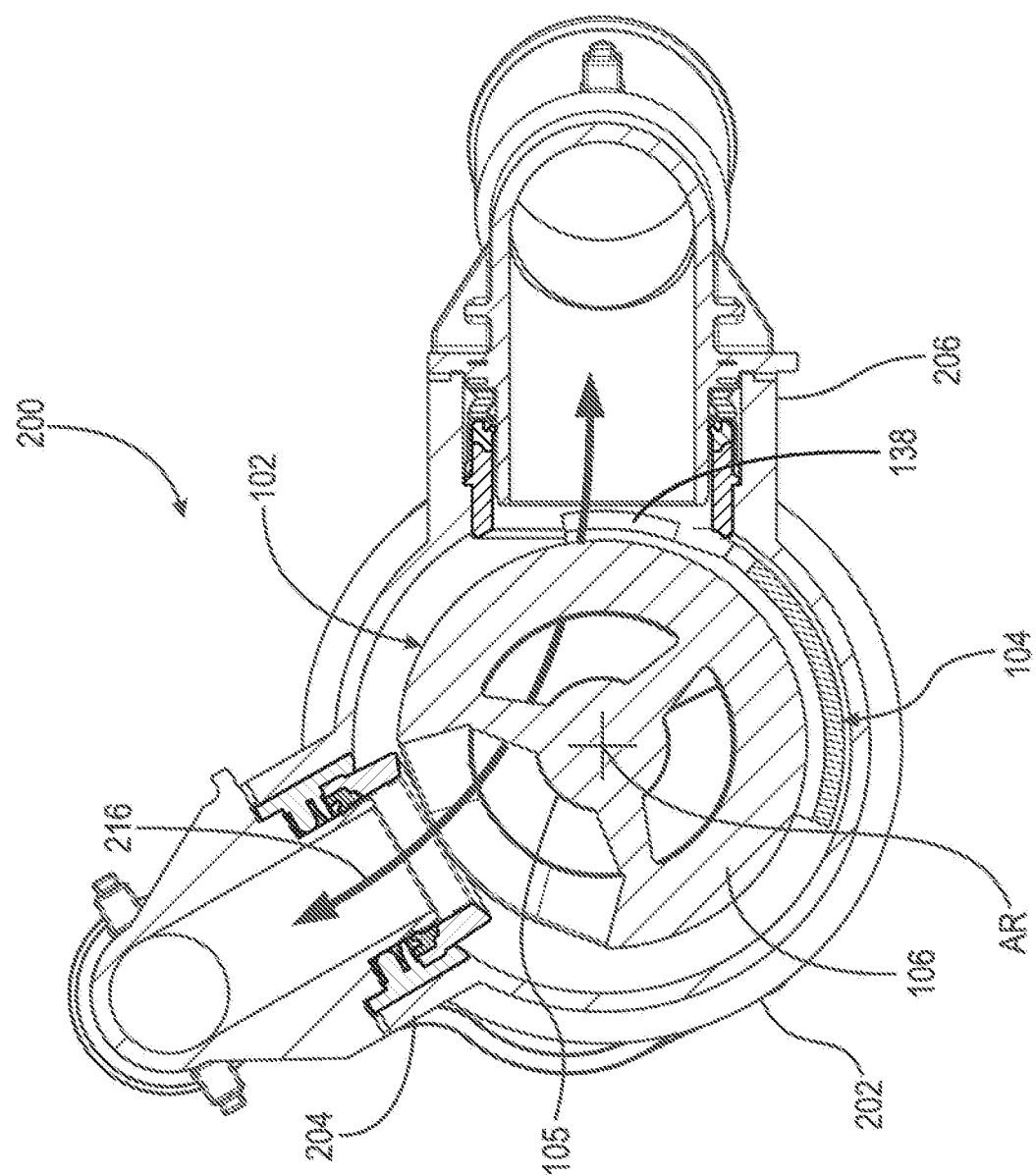
FIG. 13 is a cross-sectional view generally rally along line 9,12-17/9,12-17 in FIG. 7.

FIG. 13 is a cross-sectional view generally along line 9,12-17/9,12-17 in FIG. 7. FIG. 13 illustrates a second flow configuration of coolant control valve 200. For the second flow configuration of valve 200, at least a portion of opening 118 overlaps port 204 and a portion of valve 104 overlaps port 206. In the example of FIG. 13, primary rotary valve 102 and secondary rotary valve 104 have been rotated around axis of rotation AR by actuator A such that: primary opening 118 overlaps an entirety of port 204; and a portion of secondary valve 104 overlaps port 206. For example, portion 138 of slot 136 and portions 156 of secondary body 108, axially bracketing portion 138, overlap port 206. Thus, coolant fluid flow path 216 is enabled through port 204, valve 200, and port 206. In an example embodiment, the direction of flow is through port 204 into valve 200. Valve 104 throttles fluid flow through port 206.

Figure 14:
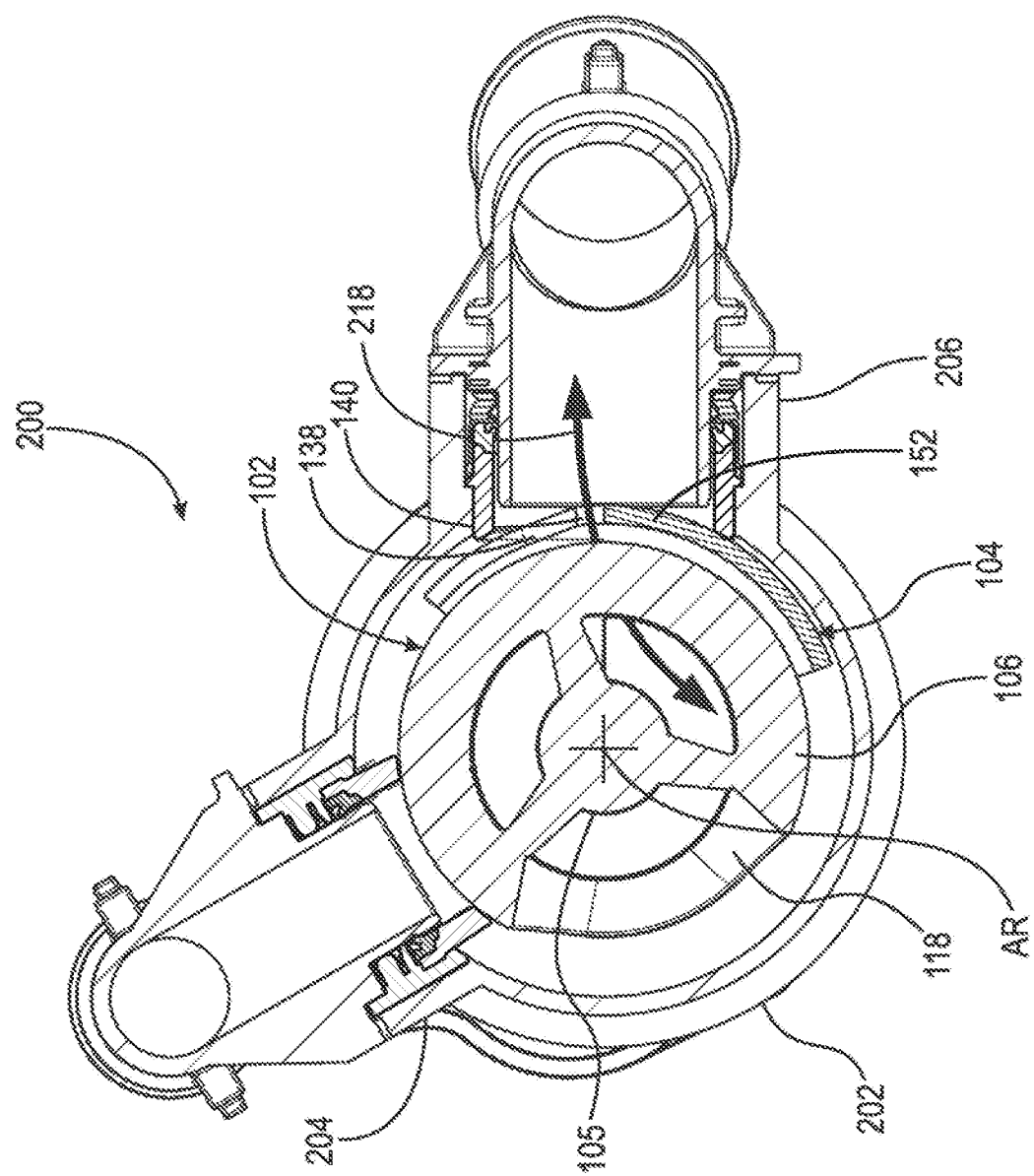
FIG. 14 is a cross-sectional view generally along line 9,12-17/9,12-17 in FIG. 7.

FIG. 14 is a cross-sectional view generally along line 9,12-17/9,12-17 in FIG. 7. FIG. 14 illustrates a third flow configuration of coolant control valve 200. In the third flow configuration of FIG. 14, primary rotary valve 102 and secondary rotary valve 104 have been rotated around axis of rotation AR by actuator A such that: primary body 106 blocks an entirety of port 204; and a portion of secondary valve 104 overlaps port 206. For example: solid portion 152 and portions 156 of secondary body 108 block a portion of port 206; and portion 140 and part of portion 138 of slot 136 overlap port 206. Thus, fluid flow path 218 is enabled through valve 200, slot 136, and port 206. In an example embodiment, the direction of flow is from valve 200 through port 206. Valve 104 throttles fluid flow through port 206.

Figure 15:
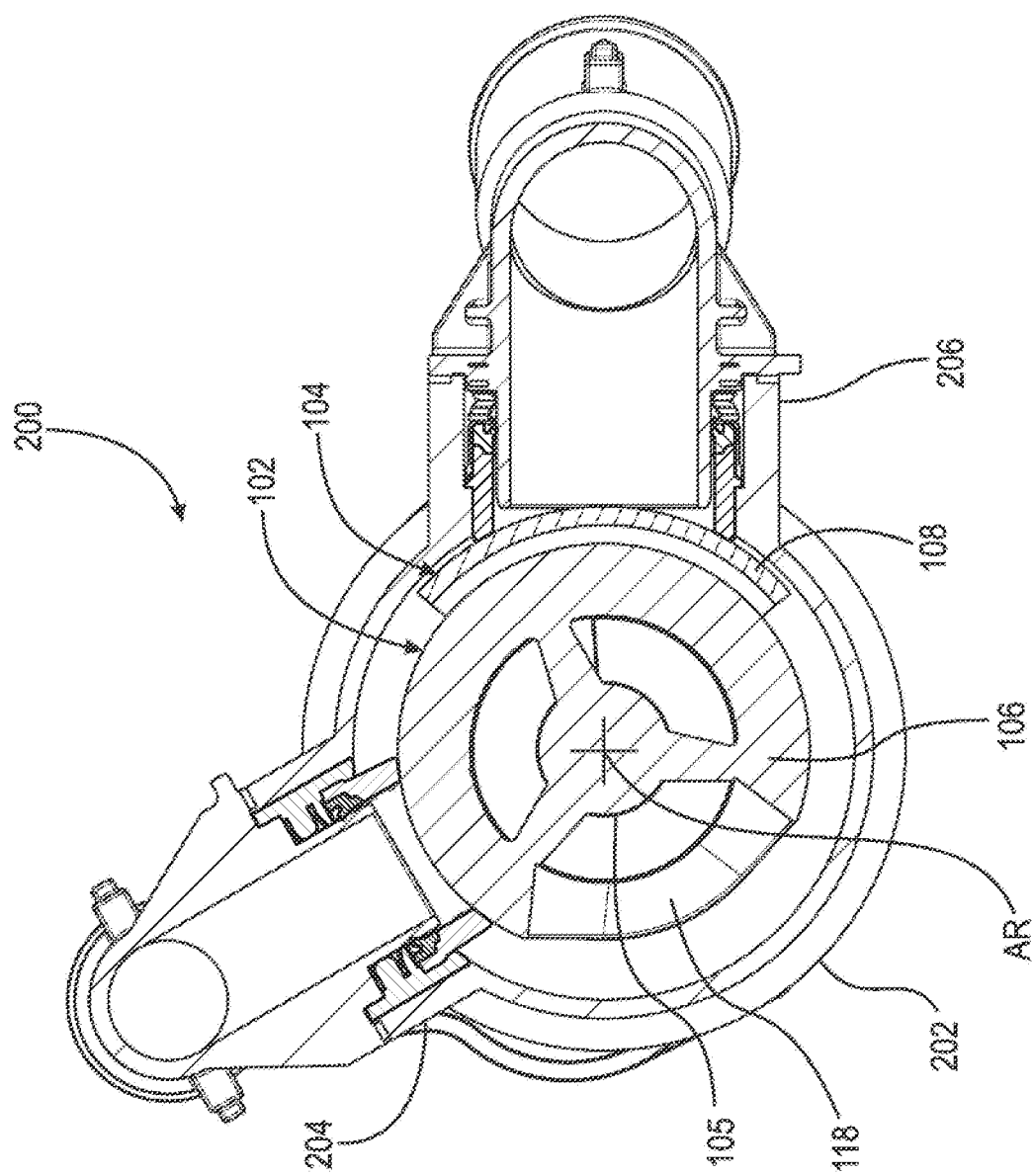
FIG. 15 is a cross-sectional view generally along line 9,12-17/9,12-17 in FIG. 7.

FIG. 15 is a cross-sectional view generally along line 9,12-17/9,12-17 in FIG. 7.

Figure 16:
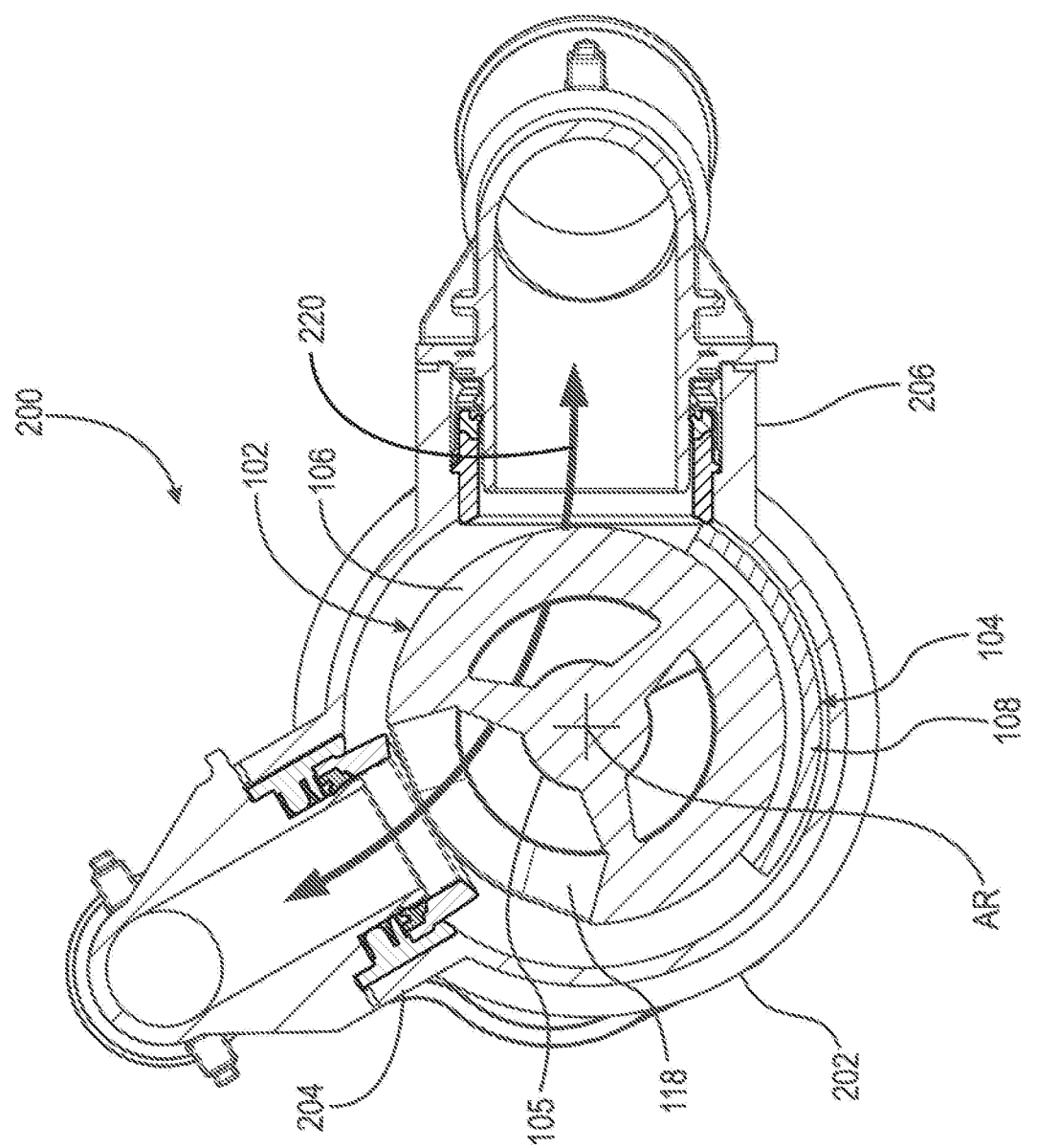
FIG. 16 is a cross-sectional view generally along line 9,12-17/9,12-17 in FIG. 7.

FIG. 16 is a cross-sectional view generally along line 9,12-17/9,12-17 in FIG. 7.

FIG. 17 is a cross-sectional view generally along line 9,12-17/9,12-17 in FIG. 7. In FIGS. 15 through 17, valve assembly 100 includes secondary rotary valve 104 shown in FIG. 6A. FIG. 15 illustrates the zero flow configuration of coolant control valve 200. In the zero flow configuration of FIG. 15, primary rotary valve 102 and secondary rotary valve 104 have been rotated around axis of rotation AR by actuator A such that primary body 106 entirely blocks port 204, and secondary body 108 entirely blocks port 206. Thus, there is no flow of fluid through valve 200.

FIG. 16 illustrates the first flow configuration of coolant control valve 200. In the first flow configuration of FIG. 16, primary rotary valve 102 and secondary rotary valve 104 have been rotated around axis of rotation AR by actuator A such that primary opening 118 overlaps all of port 204 and none of body 108 overlaps port 206. Thus, coolant fluid flow path 220 is enabled through port 204, valve 200, and port 206. In an example embodiment, the direction of flow is through port 204 into valve 200.

FIG. 17 illustrates the second flow configuration of coolant control valve 200. In the second flow configuration of FIG. 17, primary rotary valve 102 and secondary rotary valve 104 have been rotated around axis of rotation AR by actuator A such: all of primary opening 118 overlaps port 204; and secondary body 108 blocks a portion of port 206. Thus, coolant fluid flow path 222 is enabled through port 204, valve 200, and port 206. In an example embodiment, the direction of flow is through port 204 into valve 200. Valve 104 throttles fluid flow through port 206.

In the examples of FIGS. 12 through 17, there are at least two options regarding circumferential extent 154 of secondary body 108: in one option, extent 154 is greater than or equal to circumferential extent 210 of port 206, to enable implementation of the zero flow configuration illustrated in FIG. 9; in another option, extent 154 is less than extent 210.

In an example embodiment, valve 200 includes: fitting 224 connected to port 204; fitting 226 connected to port 206; seal package 228; seal package 230; resilient element 232; and resilient element 234. Seal packages 228 and 230, via resilient elements 232 and 234, are displaceable, orthogonal to axis AR, within port 204 and port 206, respectively, to interface with valve 102 and valve 104, respectively.

In the example of FIGS. 1 and 7: outer surface 119 of primary body 106 has uniform radial dimension 158 along radius 113 in direction RD; and inner surface 120 of secondary body 108 has uniform radial dimension 160, greater than dimension 158 along radius 114 in direction RD. Thus, body 108 extends past body 106 in direction RD. As valves 102 and 104 rotate around axis AR, valves 102 and 104 make and break contact with seal packages 228 and 230, respectively.

For example, in the first flow configuration shown in FIG. 12, resilient elements 232 and 234 are pushing seal packages 228 and 230, respectively, radially inwardly. To transition to the zero flow configuration shown in FIG. 9: valves 102 and 104 are rotated in direction CD2 so that bodies 106 and 108, respectively contact and slide along seal packages 228 and 230, respectively. Bodies 106 and 108 push seal packages 228 and 230 radially outwardly as resilient elements 232 and 234 urge packages 228 and 230 radially inwardly, respectively, sealing ports 204 and 206 with packages 228 and 230, respectively.

Coolant control valve 200 is not limited to the flow configurations described above. For example: referencing the flow configurations of FIG. 12 and FIG. 16, port 204 can be partly blocked by body 106, and port 206 can be partly blocked by body 108; referencing the flow configuration of FIGS. 13, 14, and 17, port 204 could be partly blocked by body 106, and the degree of overlap between valve 104 and port 206 could be changed.

Rotary valve assembly 100 provides an axially compact configuration in which primary rotary valve 102 and secondary rotary valve 104 are nested and radially stacked to minimize axial length 162 of assembly 100. For coolant control valve 200, the nesting and radial stacking of primary rotary valve 102 and secondary rotary valve 104 enable ports 204 and 206 to be circumferentially aligned, for example, center lines L2 and L3 for ports 204 and 206, respectively, are co-planar. Thus, axial length 236 of housing 202 is minimized, while enabling a full range of coolant fluid flow control options for valve 200.

It will be appreciated that various of the above-disclosed and other features and functions, or alternatives thereof, may be desirably combined into many other different systems or applications. Various presently unforeseen or unanticipated alternatives, modifications, variations, or improvements therein may be subsequently made by those skilled in the art which are also intended to be encompassed by the following claims.

LIST OF REFERENCE CHARACTERS

A actuator
AD axial direction
AR axis of rotation
CD1 circumferential direction
CD2 circumferential direction
CP cover plate
L1 line
L2 line
L3 line
P plane
P1 point, axis AR
P2 point, axis AR
PC planet carrier
PG planet gear
PGS planetary gear set
PM prime mover
SG sun gear
100 rotary valve assembly
102 primary rotary valve
104 secondary rotary valve
105 center shaft
106 primary body
108 secondary body
110 annular portion, primary rotary valve
112 flange, secondary rotary valve
113 radius
114 radius
115 edge, primary rotary valve
116 edge, primary rotary valve
118 opening, primary rotary valve
119 outer surface, primary body
120 inner surface, secondary body
122 edge, secondary body
124 edge, secondary body
126 through-bore, secondary body
128 edge, secondary body
130 circumferential extent, through-bore
132 side, secondary body
134 side, secondary body
136 slot, secondary body
138 portion, slot
140 portion, slot
142 axial extent, slot portion
144 circumferential extent, slot portion
146 end, slot portion
148 axial extent, slot
150 circumferential extent, slot portion
152 solid portion, secondary body
154 circumferential extent, solid portion
156 portion, secondary body
158 radial dimension, primary body
160 radial dimension, secondary body
162 axial length, rotary valve assembly
200 coolant control valve
202 housing
204 port
206 port
208 circumferential extent, port
210 circumferential extent, port
212 angle
214 coolant fluid flow path 216 coolant fluid flow path
218 coolant fluid flow path
220 coolant fluid flow path
222 coolant fluid flow path
224 fitting
226 fitting
228 seal package
230 seal package
232 resilient element
234 resilient element
236 axial length, housing

The invention claimed is:

1. A coolant control valve, comprising:
a housing with a first port and a second port;
a primary rotary valve:
  disposed within the housing; and,
  including a primary body; and,
a secondary rotary valve:
  disposed within the housing; and,
  formed by a single-piece secondary body, wherein:
the primary rotary valve and the secondary rotary valve are rotatable around an axis of rotation by at least one actuator to a first configuration, and the secondary body is discontinuous in a circumferential direction around an entirety of the axis of rotation; and,
in a first configuration of the primary rotary valve and the secondary rotary valve around the axis of rotation:
  a first straight line, orthogonal to the axis of rotation, passes through the primary body and the first port; and,
  a second straight line, orthogonal to the axis of rotation and co-planar with the first straight line, passes through the secondary body and the second port.

2. The coolant control valve of claim 1, wherein a plane orthogonal to the axis of rotation and intersecting the axis of rotation at only one point, bisects the primary body and the secondary body in an axial direction parallel to the axis of rotation.

3. The coolant control valve of claim 1, wherein at least a portion of the primary rotary valve is nested within the secondary rotary valve.

4. The coolant control valve of claim 1, wherein:
the primary rotary valve is continuous in the circumferential direction.

5. The coolant control valve of claim 1, wherein:
the primary rotary valve is a ball valve and the primary body is in a shape of a portion of a first sphere; and,
the secondary body is in a shape of a portion of a second sphere concentric with the first sphere.

6. The coolant control valve of claim 1, wherein the primary rotary valve and the secondary rotary valve are rotatable, by the at least one actuator, with respect to each other and around the axis of rotation.

7. The coolant control valve of claim 1, wherein a center line of the first port and a center line of the second port are co-planar with a plane orthogonal to the axis of rotation and passing through the axis of rotation at only one point.

8. The coolant control valve of claim 1, wherein:
the primary rotary valve and the secondary rotary valve are rotatable around the axis of rotation and by the at least one actuator to a zero flow configuration; and,
in the zero flow configuration, the primary body blocks an entirety of the first port and the secondary body blocks an entirety of the second port.

9. The coolant control valve of claim 1, wherein:
the primary rotary valve defines a primary opening;
the primary rotary valve and the secondary rotary valve are rotatable around the axis of rotation and by the at least one actuator to a flow configuration; and,
in the flow configuration, the primary opening overlaps at least a portion of the first port and none of the second body overlaps the second port.

10. The coolant control valve of claim 9, wherein the primary opening overlaps an entirety of the first port.

11. The coolant control valve of claim 1, wherein:
the primary rotary valve defines an opening;
the primary rotary valve and the secondary rotary valve are rotatable around the axis of rotation and by the at least one actuator to a flow configuration; and,
in the flow configuration:
the opening overlaps an entirety of the first port; and,
the secondary body blocks only a portion of the second port.

12. The coolant control valve of claim 1, wherein:
the primary rotary valve and the secondary rotary valve are rotatable around the axis of rotation and by the at least one actuator to a flow configuration; and,
in the flow configuration:
the primary body blocks an entirety the first port; and,
the secondary body blocks only a portion of the second port.

13. The coolant control valve of claim 1, wherein the secondary body at least one of:
includes an edge extending at least partly in an axial direction parallel to the axis of rotation, the secondary body defines a slot extending into the secondary body from the edge, and the slot overlaps the second port; or,
defines a through-bore bounded by a continuous edge of the secondary body, and at least a portion of the through-bore overlaps the second port.

14. The coolant control valve of claim 1, wherein the secondary body includes an edge extending at least partly in an axial direction parallel to the axis of rotation.

15. The coolant control valve of claim 1, wherein the secondary body includes an edge defining a throttle.

16. A coolant control valve, comprising:
a housing with a first port and a second port;
a secondary rotary valve:
  disposed within the housing; and,
  formed by a single-piece secondary body; and,
a primary rotary valve:
  including at least a portion nested within the secondary rotary valve;
  including a primary body; and,
  defining a primary opening, wherein:
the secondary body defines a secondary opening; and,
the primary rotary valve and the secondary rotary valve are rotatable by at least one actuator and around an axis of rotation, the secondary body is discontinuous in a circumferential direction around an entirety of the axis of rotation, wherein the primary rotary valve and the secondary rotary valve are rotatable to:
  a zero flow configuration in which the primary body blocks the first port and the secondary body blocks the second port; or,
  a first flow configuration in which the primary opening overlaps at least a portion of the first port and none of the second body overlaps the second port; or, a second flow configuration in which the primary opening overlaps an entirety of the first port and the secondary body blocks only a portion of the second port; or, a third flow configuration in which the primary body blocks the first port and the secondary body blocks only a portion of the second port.

\* \* \* \* \*